Dec. 8, 1964   R. LUCIEN ETAL   3,160,073
HYDRAULIC MOTOR

Filed Jan. 24, 1962   5 Sheets-Sheet 1

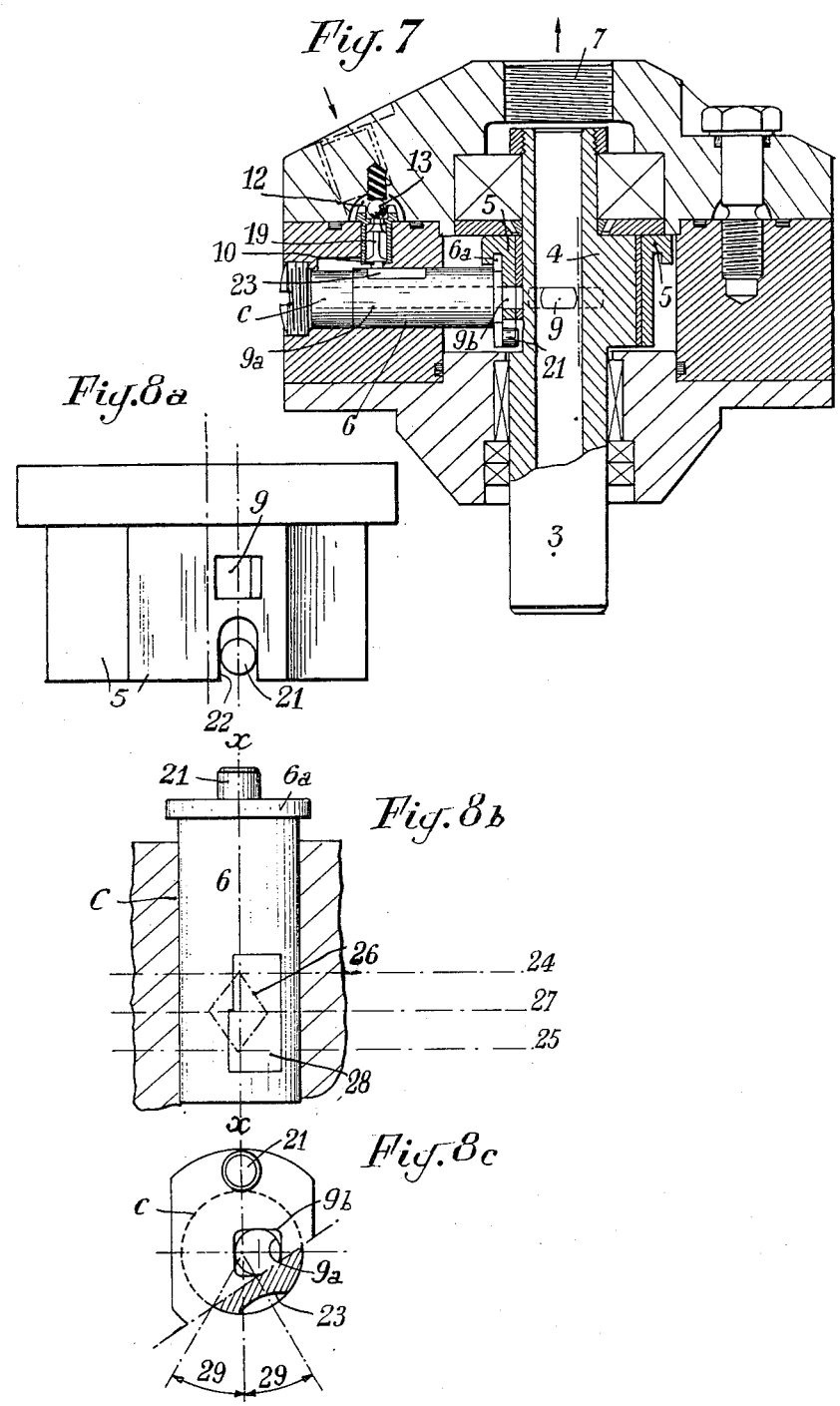

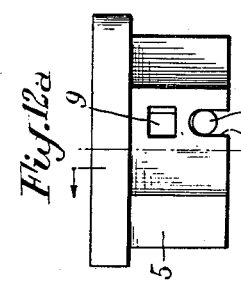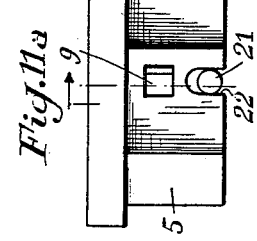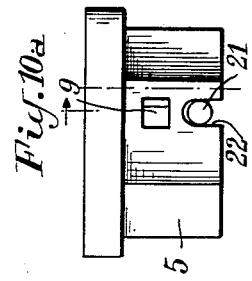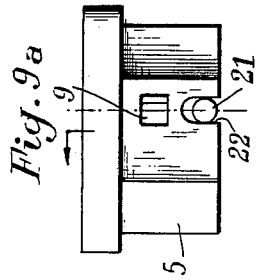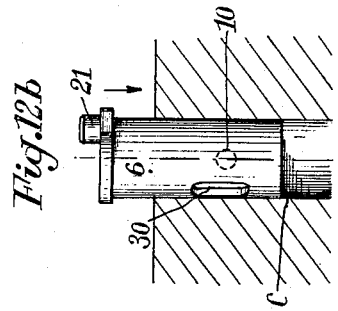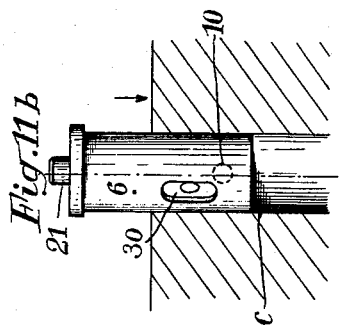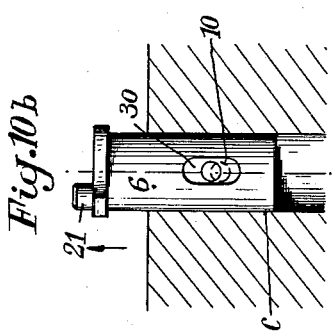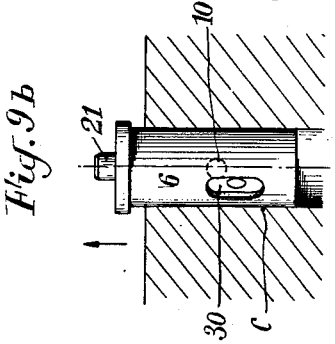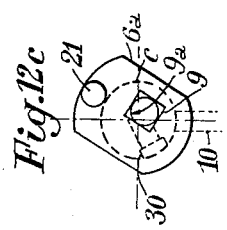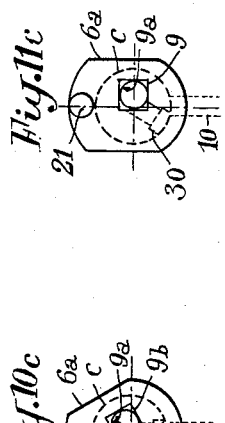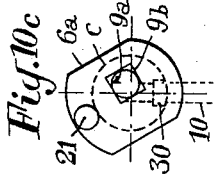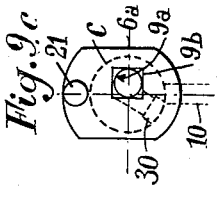

United States Patent Office 3,160,073
Patented Dec. 8, 1964

3,160,073
HYDRAULIC MOTOR
René Lucien, 56 Boulevard Maillot, Neuilly sur Seine, France, and Emile Tetart, Louvie Juzon, Basses Pyrenees, France
Filed Jan. 24, 1962, Ser. No. 168,334
Claims priority, application France, Feb. 3, 1961, 851,665, Patent 1,287,601; Nov. 20, 1961, 879,507
9 Claims. (Cl. 91—183)

The present invention relates to a hydraulic motor with radial pistons which results from the conversion of a pump of the same type and belonging to the category in which, on the one hand the movement of the pistons in thier fixed cylinders is generated by a polygonal member supporting the said pistons, mounted on an eccentric carried—in the case of a pump—by the driving shaft, while on the other hand, the deliveries of the cylinders are discharged on a flat surface in the form of a circular ring which carries delivery valves.

A pump of this type has been described in U.S. patent application Serial No. 97,339 filed on March 21st 1961, now Patent No. 3,125,034 by the same applicant, and titled "Pump With Radial Cylinders."

In order to effect the conversion of this pump to a hydraulic motor, the present invention consists in its principle, in supplying the apparatus through the general delivery orifice of the pump and in measuring the admission to the respective cylinders of the liquid under pressure by a control synchronized with the rotation of the shaft.

In the accompanying drawings:

FIG. 1 is a view showing two axial half-sections of a first form of construction according to the invention, of a pump of the type referred to, converted to a hydraulic motor.

FIGS. 2 and 3 are transverse half-sections, taken respectively along the lines 2—2 and 3—3 of FIG. 1.

FIG. 4 is a diagram on twice the scale of the preceding figures, showing the kinematics of the control of distribution of the fluid under pressure.

FIG. 5 groups together three stages of the opening and closure movement of an admission valve of the motor of the preceding figures.

FIG. 7 is a view taken along two axial half-sections of a further form of construction according to the invention, of a pump of the kind considered, converted to a hydraulic motor.

FIGS. 8a–8b–8c are respectively, to a larger scale than FIG. 7, a view in elevation of the polygonal member, a plan view and an end view of a piston in its cylinder.

Figure 1:
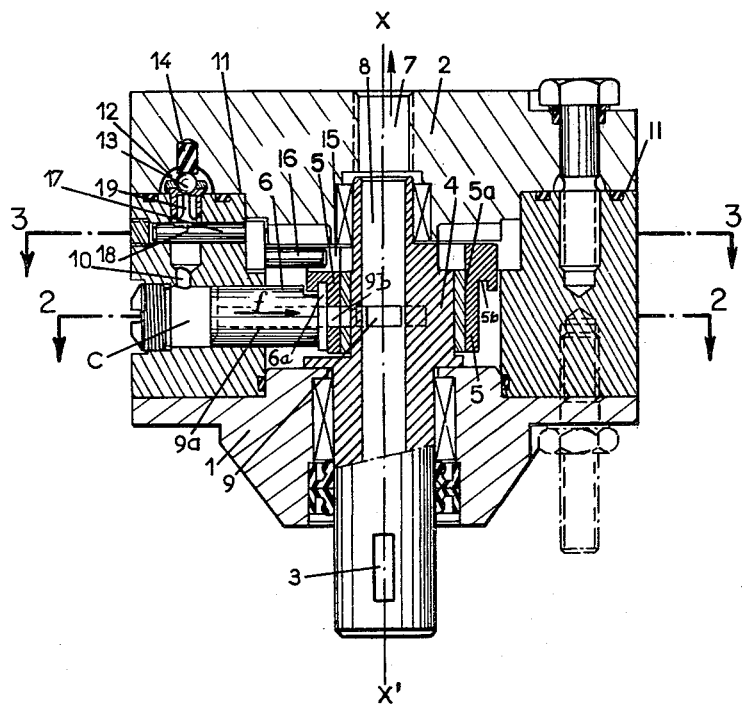

FIGS. 9–10–11–12, given the indices a, b, c, relate to an alternative form of construction of the motor according to FIG. 7.

Referring now to FIGS. 1 to 4:

The radial pump considered here, converted to a motor, has six cylinders, but this number is obviously not limitative. As in the above-mentioned patent application, it comprises a body 1, and end-plate 2 and a shaft 3 with an eccentric 4. This shaft becomes in the case of the motor the driven shaft.

A hexagonal member 5 actuates the pistons 6 which move in their respective cylinders C. The general admission orifice 7—which in the case of the motor becomes the return orifice to the tank—communicates with an axial bore 8 provided with ports 9 formed in the eccentric 4, and which are in intermittent communication through ports 9b of the polygonal member, with an axial bore 9a, formed in each piston.

Each cylinder is provided with an admission orifice 10 covered by a flat surface 11 in the form of a circular ring, de-limiting the base of a collective admission chamber 12 in which are mounted admission valves constituted by balls 13 acted upon by rubber blocks 14.

The collective admission chamber 12 communicates with the general admission orifice (not shown).

Figure 4:
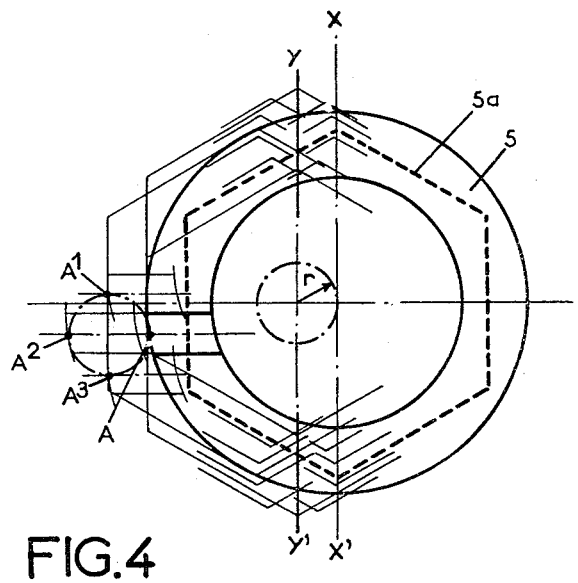
Figure 3:
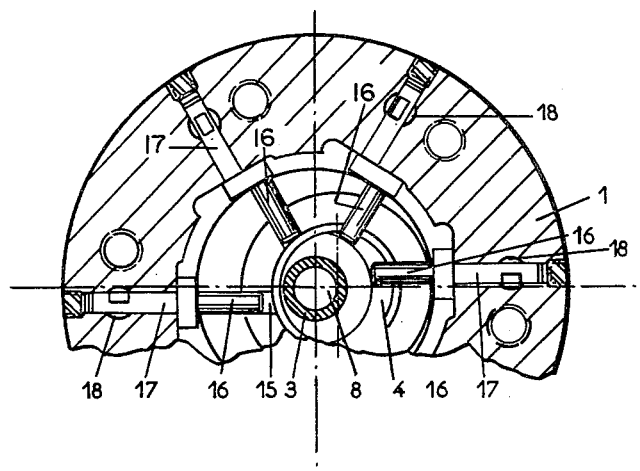
Figure 2:
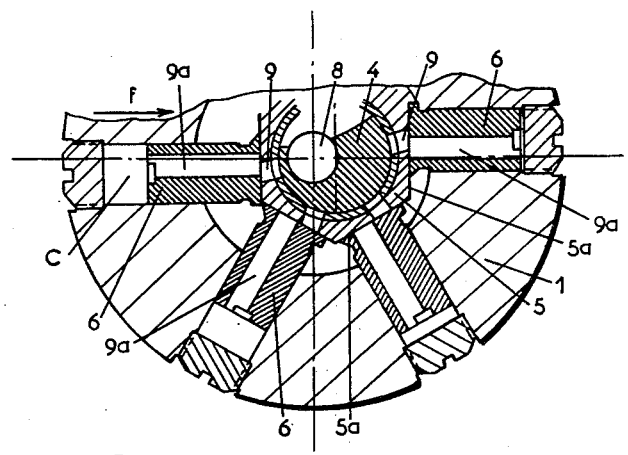

The control of distribution of the fluid under pressure at the cylinders is based on the following observations with reference to FIG. 4, which is diagrammatic and is on twice the scale of the preceding figures.

The movement of the hexagonal member 5 is controlled on the one hand in dependence on the sliding of the respective pistons on the supporting faces 5a in which they are encased by projections 6a penetrating into grooves 5b, with the possibility of a relative movement in the plane of these faces, and on the other hand on the movement of rotation of the eccentric shaft 3–4. The result is that the hexagonal member revolves about said shaft in fixed attitude such that each point A of the hexagonal member describes a circular path $A$–$A^1$–$A^2$–$A^3$, the diameter of which is equal to twice the value of the eccentricity $r$ (the distance from the axis $x$—$x$ to the axis $y$—$y$). This is of course the case for any point whatever of the base of each of the pistons.

The essential characteristic of the invention precisely consists in utilizing, for the control of synchronization of the admission valves, the relative displacement $A^1$–$A^3$, parallel to the bases of the pistons.

To this end, in the hexagonal member directly below each of the pistons, there is formed a cavity 15 which receives the arm 16 of an eccentric lever, the opposite arm 17 of which includes a cam profile. This profile is in this case (FIGS. 1, 3 and 5) constituted by a simple milled projection 18, but it can be produced by any other equivalent means, as for example by a boss. The projection 18 actuates a push-rod 19, which causes the lifting of the corresponding closure ball 13.

Figure 5:
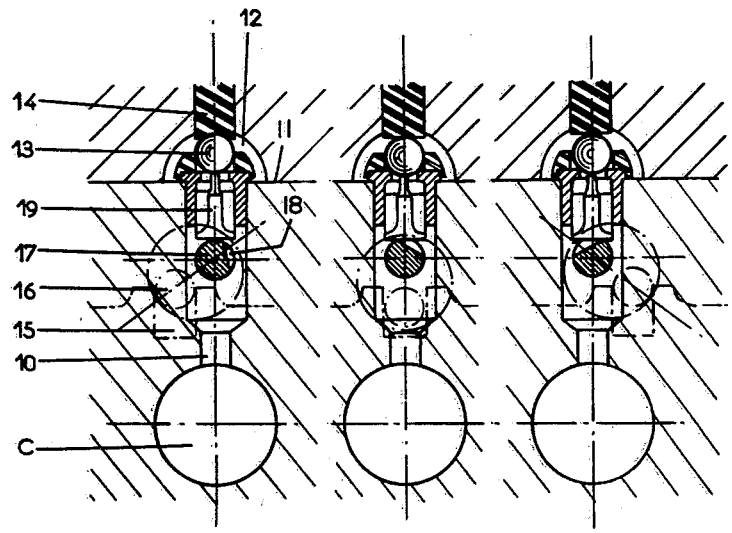

FIG. 5 shows three stages of the movement of opening and closure. The lifting phase of the ball permits the supply to the cylinder of the fluid under pressure which gives the driving stroke of the piston in the direction of the arrow $f$ (FIGS. 1 and 2), while the discharge of the cylinder into the tank through the orifice 7 is effected during the opposite stroke.

As the hexagonal member undergoes its revolving movement as a result of the driving by the pistons, the arms 16 which are supported in the cavities 15 of the hexagonal member are caused to oscillate back and forth along an arcuate path about an axis passing through lever arm 17. This oscillating movement of the arms 16 causes oscillatory angular movement of the opposite arms 17 which act to raise and lower the balls 13 of the admission valves. It is to be seen from FIG. 5 that as the arms 16 undergo their oscillatory movement along the arcuate path the arms 16 ride up and down in the cavities 15 in a direction normal to the plane of the cylinders.

Figure 6:
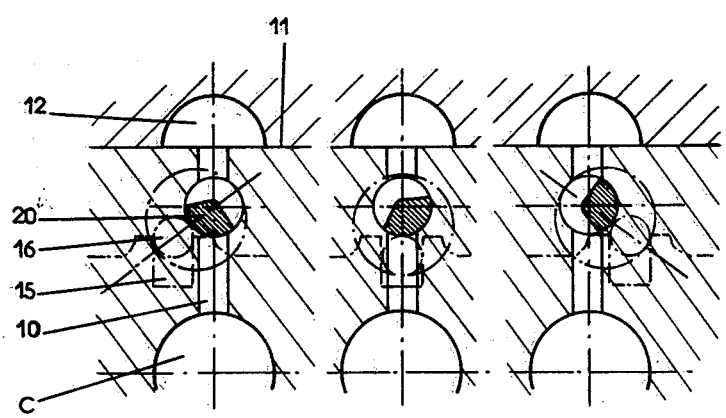
FIG. 6 is an alternative form of the embodiment shown in FIG. 5.

FIG. 6 is an alternative form of FIG. 5, in which the eccentric lever 16–17 drives in rotation a shutter 20 which opens or closes the communication between the admission orifice 10 and the collective admission chamber 12 for the liquid under pressure.

In the form of embodiment of the invention shown in FIGS. 7–8 and 8b–8c, and its alternative form according to FIGS. 9 to 12 (with indices), the eccentric levers are dispensed with. The synchronization is ensured by imparting directly to the pistons by the polygonal member, an alternating movement of rotation about their axes. This rotational movement of the pistons is effected following two angles of maximum displacement, symmetrical with respect to the diametral plane passing through the general axis of the motor.

With reference to FIGS. 7–8a–8b–8c:

As before, as each piston 6 is moved in its cylinder C there is caused displacements of the hexagonal member 5 mounted on the eccentric 4 of the shaft 3.

The liquid under pressure passing into the collective admission chamber 12 must pass through the orifices 10 into the cylinders C, and then into the bores 9a of the pistons, so as to be finally evacuated by the intermittent coincidence of the ports 9b and 9, respectively formed in the hexagonal member and in the eccentric, towards the return orifice 7 to the tank.

In the form of embodiment considered, a lug 21 is located on the base of each piston and is fitted into a groove 22 of the hexagonal member.

In consequence, the movements of the said member impart to the pistons, not only a to-and-fro movement in their respective cylinders, as in the case of FIGS. 1 to 6, but also an angular movement about the common axis of the piston and the cylinder.

The extremity of each piston is provided with a cam profile 23, which actuates a push-rod 19, the latter causing the ball 13, acting as an admission valve, to lift.

In FIGS. 8b and 8c, the references 24 and 25 indicate respectively the top dead centre and the bottom dead centre; 26 is the cycle carried out by the pistons under the push-rod; 27, the extreme positions of the hexagon member; 28 is the zone of closure of the ball and 29 is the maximum angle of displacement of the piston.

In the form of embodiment according to FIGS. 9 to 12 (with indices) the angular displacements of the piston have the effect of alternately establishing and interrupting the communication between the admission orifice 10 and an oblong port 30 formed in the piston and opening on the bore 9a of this latter.

The said figures represent the four principal stages of the movements of a piston from the top dead center position (FIG. 9) to the bottom dead center position (FIG. 11) and symmetrical return. It can be seen that the admission of the liquid under pressure is effected during the stroke (driving) comprised between the successive positions corresponding to these FIGS. 9 to 11, and that it is a maximum in the intermediate position (FIG. 10), while the evacuation of the liquid towards the orifice 7 is effected during the stroke (expansion) comprised between the positions which correspond to FIGS. 11–12 and 9.

It will be observed that the positions shown in the FIGS. 9–10–11–12 correspond respectively to the points $A^2$–$A^3$–$A$–$A^1$ of the diagram of FIG. 4.

It will also be noted that the bore 9a of the pistons is not in the admission axis; the position of this bore corresponds to the necessities of the admission, taking account of the displacement of the piston itself with respect to the hexagonal member, for considerations of balancing of the couple.

What we claim is:

1. A hydraulic motor comprising a rotatable shaft, a plurality of cylinders disposed radially around said shaft in a common plane, said shaft being provided with an axial bore, individual pistons supported in respective cylinders for reciprocating movement, each piston being provided with an axial bore therein in intermittent communication with the axial bore of said shaft, an eccentric supported on said shaft for rotation therewith, a polygonal member mounted on said eccentric and having separate faces in engagement with respective of said pistons to correlate reciprocal movement of the pistons with rotation of the shaft and eccentric, each cylinder having an admission orifice for the introduction of liquid under pressure, said orifices opening in a common plane, an admission valve for each orifice, said polygonal member having a cavity in each face, and means supported in each of said cavities of said polygonal member and operatively associated with the admission valve corresponding to the particular face in which the cavity is provided, for undergoing displacement in the respective cavity in a direction approximately normal to the plane of the cylinders as the shaft rotates to open the corresponding admission valve in synchronization with the rotation of the shaft.

2. A hydraulic motor as claimed in claim 1 wherein said means which is engaged in each of the cavities includes a lug rigid with each piston, the lugs being accommodated in the respective cavities in the polygonal member, said cavities lying parallel to the axis of the pistons to cause oscillatory angular displacement of the pistons as the shaft rotates, said means further comprising cam profiles directly on each of the respective pistons controlling the corresponding admission valve.

3. A hydraulic motor as claimed in claim 1 wherein said means comprises, for each piston: an eccentric lever including one arm engaged in the corresponding cavity and another arm controlling the opening of the admission valve of the corresponding cylinder.

4. A hydraulic motor as claimed in claim 1 wherein said means comprises, for each piston: an eccentric lever including one arm engaged in the corresponding cavity and another arm including a cam profile which controls the opening of the admission valve of the corresponding cylinder.

5. A hydraulic motor as claimed in claim 1 wherein said means engaged in each of said cavities imparts directly to said pistons an alternating angular displacement about their respective axes and comprises means utilizing said alternating angular displacement for controlling said admission valves.

6. A hydraulic motor as claimed in claim 1 wherein said means engaged in each of said cavities imparts directly to said pistons an alternating angular displacement about their respective axes and comprises cam profiles arranged directly on each of the respective pistons controlling the corresponding admission valve.

7. A hydraulic motor comprising a rotatable shaft, a plurality of cylinders disposed radially around said shaft in a common plane, said shaft being provided with an axial bore, individual pistons supported in respective cylinders for reciprocating movement, each piston being provided with an axial bore therein in intermittent communication with the axial bore of said shaft, an eccentric supported on said shaft for rotation therewith, a polygonal member mounted on said eccentric and having separate faces in engagement with respective pistons to correlate reciprocal movement of the pistons with rotation of the shaft and eccentric, each cylinder having an admission orifice for the introduction of liquid under pressure, said orifices opening in a common plane, said polygonal member having a cavity in each face and means engaged in each of said cavities to undergo displacement in the respective cavity in a direction approximately normal to the plane of the cylinders as the shaft rotates for controlling opening and closing of the orifices.

8. A hydraulic motor as claimed in claim 7 wherein said means engaged in each of the cavities includes a lug rigid with each piston, the lugs being accommodated in the respective cavities in the polygonal member, said cavities lying parallel to the axis of the piston to cause the pistons themselves to undergo alternating angular displacement while they reciprocate in the corresponding cylinders, each piston being provided with an oblong port adapted to come opposite the corresponding admission orifice during the course of the alternating angular displacement of the piston, said port communicating with the axial bore of the piston.

9. A hydraulic motor as claimed in claim 1 wherein said means comprises, for each piston: an eccentric lever having one arm engaged in the corresponding cavity, a shutter mounted adjacent the admission orifice of the corresponding cylinder, said lever having an opposite arm engaging said shutter for rotating the same to control opening and closing of the orifices.

References Cited in the file of this patent

UNITED STATES PATENTS

| | | |
|---|---|---|
| 555,465 | Prosser | Feb. 25, 1896 |
| 1,526,343 | Jovanneaux | Feb. 17, 1925 |
| 1,964,245 | Benedek et al. | June 26, 1934 |
| 2,345,125 | Huber | Mar. 28, 1944 |
| 2,475,458 | Orshansky | July 5, 1949 |
| 2,612,837 | Midgette | Oct. 7, 1952 |
| 2,679,808 | Thun | June 1, 1954 |
| 2,818,816 | Christenson | Jan. 7, 1958 |
| 3,036,557 | Kimsey | May 29, 1962 |

FOREIGN PATENTS

| | | |
|---|---|---|
| 1,247,443 | France | Oct. 24, 1960 |
| 633,773 | Great Britain | Dec. 30, 1949 |